Oct. 17, 1961 E. E. MOYER ET AL 3,005,142
MAGNETIC AMPLIFIER CONTROL CIRCUIT
Filed July 24, 1958 2 Sheets-Sheet 1

INVENTORS
ELMO E. MOYER
RICHARD J. KLEIN
BY
Woodling and Krost,
Attys.

Oct. 17, 1961    E. E. MOYER ET AL    3,005,142
MAGNETIC AMPLIFIER CONTROL CIRCUIT
Filed July 24, 1958    2 Sheets-Sheet 2

INVENTORS
ELMO E. MOYER
RICHARD J. KLEIN
BY Woodling & Krost
attys.

United States Patent Office 3,005,142
Patented Oct. 17, 1961

3,005,142
MAGNETIC AMPLIFIER CONTROL CIRCUIT
Elmo E. Moyer, Cuba, and Richard J. Klein, Caneadea, N.Y., assignors to Acme Electric Corporation, Cuba, N.Y., a corporation of New York
Filed July 24, 1958, Ser. No. 750,774
15 Claims. (Cl. 321—16)

The invention relates in general to magnetic amplifier electrical control circuits and more particularly to the control of direct current loads by means of saturable reactors in turn controlled by a transistor control circuit.

It has previously been suggested to utilize transistors to control saturable reactors in turn controlling a load but several difficulties have arisen, an outstanding one being that the peak voltage which may be applied to the transistor limits the alternating current input voltage with which the circuit is used. This has limited the control circuits to relatively small power applications.

Accordingly an object of the invention is to provide a transistor controlled magnetic amplifier circuit which is not limited by the magnitude of the alternating current input voltage.

Another object of the invention is to provide a simple and reliable control circuit applicable with many different forms of loads.

Another object of the invention is to provide a voltage regulator circuit for controlling a direct current load having a counter-electromotive force.

Still another object of the invention is to provide a current regulating control circuit for regulating the current in a direct current load.

Another object of the invention is to provide a combined voltage regulating and current regulating circuit using only a single saturable reactor for both control functions.

Another object of the invention is to provide transistor controlled magnetic amplifier circuits of either half-wave or full-wave design and using only a single transistor.

Another object of the invention is to provide a voltage regulating circuit which is temperature compensating.

Another object of the invention is to provide a voltage regulating circuit for a direct current load having a counter-electromotive force which is extremely accurate in its control of voltage throughout the entire desired range.

Other objects and a fuller understanding of the invention may be had by referring to the following description and claims, taken in conjunction with the accompanying drawing, in which:

Figure 1:
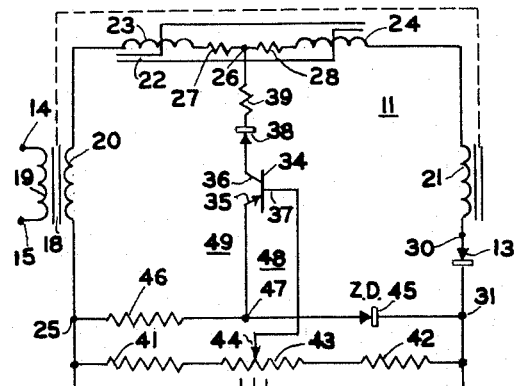
FIGURE 1 is a schematic diagram of a simple transistor control magnetic amplifier circuit embodying the invention.

FIGURE 1 shows a regulator circuit 11 for controlling a load 12 energized through a rectifier 13 from a voltage source which may be applied at terminals 14 and 15. The load 12 is a direct current load and has been shown as a storage battery, representative of any form of direct current load having a counter-electromotive force such as a load which is largely capacitive, or a motor.

A transformer 18 has a primary 19 connected to the alternating current terminals 14 and 15 and has first and second secondaries 20 and 21 on a common core. This core has been shown as being split in the drawing but this is only for ease in rendering the schematic diagram and actually the two secondaries 20 and 21 are on the same transformer core. A saturable reactor 22 has a single saturable core and first and second windings 23 and 24. First and second terminals 25 and 26 are provided in the circuit with the first secondary 20, the first saturable reactor winding 23 and a first power resistor 27 connected in series between these terminals. A third terminal 30 is connected at the anode electrode of the rectifier 13 and a fourth terminal 31 is connected at the cathode electrode of this rectifier. The second secondary 21, the second saturable reactor winding 24 and a second power resistor 28 are connected in series between the second and third terminals 26 and 31. The load 12 is connected across the first and fourth terminals 25 and 31 and hence these may be considered as the output terminals. The alternating current voltage applied to the circuit 11 is derived from the secondaries 20 and 21; hence the alternating current input terminals may be considered to be terminals 25 and 30. The rectifier 13 may be considered to be a part of the load circuit because it is the rectifier 13 which makes the load circuit a direct current load circuit.

A transistor 34 having emitter, collector, and base electrodes 35, 36 and 37, respectively, is provided with the collector 36 connected through a current control diode 38 and a current limiting resistor 39 to the terminal 26. A feedback system is provided in the circuit 11, in this case provided by resistors 41 and 42, connected in series with potentiometer 43 and this series combination connected across the load 12. A movable tap 44 of the potentiometer 43 is connected to the base electrode 37. A reference voltage standard is provided for the transistor 34 and in this case a reference voltage is provided by a zener diode 45. This zener diode is connected in series with a voltage dropping resistor 46 across the load 12, so that the zener diode 45 develops a substantially constant voltage thereacross. A terminal 47 is at the junction of the zener diode and resistor 46 and the emitter electrode 35 is connected to this terminal 47.

Operation of FIGURE 1

The regulator circuit 11 is designed to permit a relatively low voltage transistor 34 to control a relatively high alternating current input voltage. To this end the ratio of the magnitude of voltage of the secondaries 20 and 21 is equal or substantially equal to the ratio of reactances of the saturable reactor windings 23 and 24. As shown in the drawing, the ratio may be in the order of 1:1 or it may be any other desired ratio such as 1:4 or even 1:10. The secondaries 20 and 21 are connected in voltage additive relationship in the loop circuit which includes the saturable reactor 22, the rectifier 13 and the load 12. The saturable reactor windings 23 and 24 are also flux additive on the core thereof, so that the voltage drops are additive. The load 12 has been shown as being positive at terminal 31 caused by the selected polarity of rectifier 13. A transistor control circuit 48 includes the emitter and base electrodes 37 and 35 of the transistor 34, the zener diode 45, the resistor 42, and right half of potentiometer 43. A transistor load circuit 49 includes the emitter and collector electrodes 35 and 36, the control diode 38, the resistors 39 and 27, saturable reactor winding 23, secondary 20, and the voltage dropping resistor 46.

The main load circuit is around the outermost loop; namely, the voltage derived from the additively connected secondaries 20 and 21 causes current flow through the rectifier 13 and load 12 dependent upon the resistance of resistors 26 and 28 and the impedance of the saturable reactor windings 23 and 24. A reset current is caused to flow through the transistor load circuit 49 which includes as part thereof the saturable reactor winding 23. Because of the polarity of the transistor 34, this reset current is in the opposite direction from the load current with respect to the saturable reactor winding 23. The load current flows during those half cycles when the secondaries impress a positive potential on the anode of rectifier 13, or at least during those portions of the positive half cycles when the impressed alternating current voltage exceeds the counter-electromotive force of the load 12. The reset current flows or may flow during the negative half cycles; that is, the opposite half cycles when a negative potential is applied to the anode of the rectifier 13.

Since the saturable reactor 22 has a saturable core, and because of the rectifier 13 passing only half waves of current through the saturable reactor windings, if the transistor load circuit 49 were not present, the core of the saturable reactor 22 would become saturated very rapidly on just one or at the most very few cycles of the alternating current input. Because of the substantially rectangular hysteresis loop characteristic of the saturable core, once this core was saturated, it would offer substantially no further impedance to the half wave pulses of current. The transistor load circuit 49 has the voltages of secondary 20 and the resistor 46 as voltage sources which are additive during the negative half cycles of potential on the anode rectifier 13. During these negative half cycles, positive potential additively from the secondary 20 and resistor 46 will be applied to the emitter electrode 35, and hence reset current will flow from the emitter to the collector electrodes 35 and 36, through the control diode 38, resistors 39 and 27 and the saturable reactor winding 23. This reset current flows only through the winding 23 rather than through both windings 23 and 24, however the core of the saturable reactor 22 can easily be made to saturate to any desired degree by this reset current, and hence will affect the impedance of the entire saturable reactor 22 on the positive half cycles. The more the saturable reactor is reset during the negative half cycles, the more impedance the saturable reactor will have during the positive half wave cycles, and hence the lower will be the voltage on the load 12.

The reactor reset current in the transistor load circuit 49 may be increased by increasing the current in the transistor control circuit 48. This may be accomplished by making the emitter 35 more positive relative to the base 37. The zener diode 45 has a property of maintaining substantially constant voltage thereacross and hence may be considered equivalent to a reference direct current voltage. As the voltage of the load 12 increases, the larger will be the voltage drop across resistor 42 and right half of potentiometer 43, which will make the base electrode 37 more negative relative to emitter 35; hence this will be the desired effect of a voltage regulator since this will cause more control current in the transistor control circuit 48, turning on the transistor for increased reset current in the transistor load circuit 49 to increase the impedance of saturable reactor 22 and hence decrease the voltage across the load 12.

The transistor has an input circuit at emitter 35 and base 37, which compares the potential at terminal 47 and potentiometer tap 44. The voltages on resistors 41, 42 and 43, on either side of movable tap 44 may be of any desired ratio, however, if this ratio is made substantially equal to the ratio of magnitude of voltages on the secondaries 20 and 21, then an added advantage in operation has been found to occur. This advantage is that the entire circuit is quite independent of any variations in the alternating voltage input. The saturable reactor 22 has been shown with windings 23 and 24, with winding 23 having a dual function of conducting load current in one direction and of conducting reset current in the opposite direction. Obviously separate windings could be provided for these functions, one having the reactance of winding 23 alone, and used for reset, and the other having the reactance of windings 23 and 24 combined, and used for the load. The combining of these two functions in one winding 23 makes a simpler circuit and one which is more economical, but both arrangements are contemplated.

In practice, this circuit has been found to be extremely rapid in operation, yet simple and reliable. The control elements are small, hence time delay is negligible and the magnetic amplifier circuit is found to effect its control function within one cycle of the alternating current input.

Because the alternating voltage input in split into two parts of any desired ratio, not necessarily an integer ratio, the peak voltage to which the transistor 34 is subjected may be limited to any desired value. At present, a relatively high value of peak voltage to which commercially available transistors may be subjected is about 80 volts, and 20 to 40 volts is a common operating peak voltage. The transistor is primarily a current device rather than a voltage device; hence relatively large load currents may be passed through it for the reset current function. The control currents in the transistor control circuit 48 are relatively small; hence the current drain for operation may be quite small which means the resistors 41, 42, 43 and 46 may be of high impedance values and relatively low wattage ratings. In many practical circuits, the resistor 46 may be eliminated because there is always some current through the emitter 35 to act as a keep-alive current for the zener diode 45.

Figure 2:
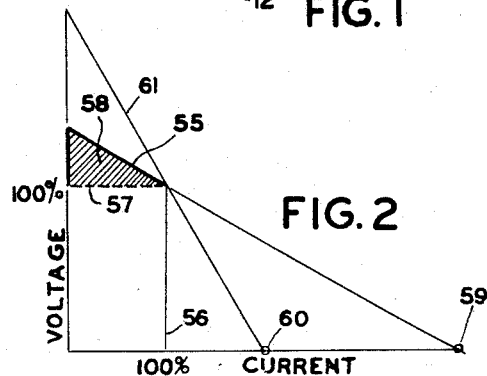
FIGURE 2 is a graph of voltage vs. current in the circuit of FIGURE 1.

FIGURE 2 is a graph of voltage vs. current obtainable in the circuit of FIGURE 1. The straight line 55 is a graph showing the voltage vs. current relationship for a particular value of circuit components including the power resistors 27 and 28. Line 56 represents 100% current and line 57 represents 100% voltage or rated voltage. The shaded area 58 between lines 55 and 57 represents the voltage absorbed in the saturable reactor 22 in order to maintain constant the voltage throughout the zero to 100% current range. After the rated current is exceeded the voltage regulating feature of the regulator circuit 11 tends to keep the voltage up by decreasing to a minimum the impedance of the saturable reactor 22. With this impedance reduced to its design minimum, it can no longer absorb less voltage in order to raise the load voltage; hence the output voltage will follow the curve 55 to some point 59 which might be 300 to 500 percent rated current. In such case, the current would be limited by the power resistances 27 and 28 and hence they may be considered as a current limiting feature. If the value of the power resistors 27 and 28 is increased, the short circuit current would be limited to perhaps 200 to 250 percent of rated current, as shown by point 60 and as determined by a voltage vs. current line 61. However, the duty on the saturable reactor 22 would be raised since it must absorb the energy in the triangular space bounded between lines 61 and 57 and the ordinate of the graph. The circuit 11 of FIGURE 1 has been found to very accurately control the voltage of load within 2% of rated voltage throughout the zero to 100% current range.

Figure 3:
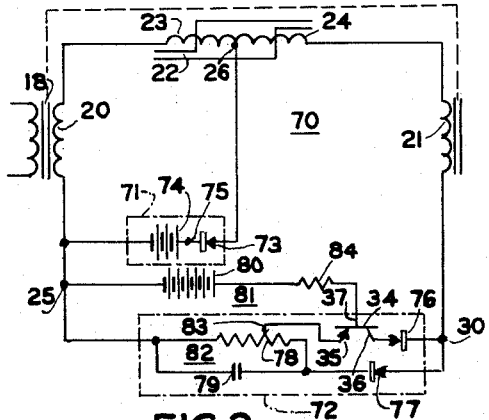
FIGURE 3 is a schematic diagram of a modified form of the invention.

FIGURE 3 shows another modification of the invention. A regulator circuit 70 is again supplied by transformer 18 having secondaries 20 and 21 connected in additive voltage relationship. The saturable reactor 22 has again been shown including the windings 23 and 24 and in this circuit since the power resistors 27 and 28 are not used, these saturable reactor windings 23 and 24 may either be separate windings joined at the terminal 26 or they may be a single winding tapped at the desired reactance ratio. The terminal 25 is again provided at the lower end of the secondary 20 and terminal 30 at the lower end of the secondary 21. In this regulator circuit 70, however, a load circuit 71 is connected between terminals 25 and 26 and a control circuit 72 is connected between terminals 25 and 30. This circuit 70 may be used to very accurately control a low voltage load 71 which in this case includes a rectifier 73 and a direct current load 74 represented by a storage battery which of course has a counter-electromotive force. A terminal 75 is connected between the battery 74 and rectifier 73 and hence the terminals 25 and 75 may be considered as output terminals to which a load on the battery 74 may be connected. A control diode 77 is connected in series with a potentiometer 78 across terminals 25 and 30 and a filter capicitor 79 is connected in parallel with the potentiometer 78 to obtain a smoother direct current voltage across the potentiometer 78. The transistor 34 has its emitter and collector electrodes 35 and 36 connected in series with a blocking diode 76 between terminal 30 and a potentiometer tap 83, and has its base electrode 37 connected through a resistor 84 and a reference voltage 80 to the terminal 25. A transistor control circuit 81 includes the reference voltage 80, resistor 84, the potentiometer 78 and the emitter and base electrodes 35 and 37. A transistor load circuit 82 is essentially the entire outside loop of the circuit 70 and is that which passes reset current during the negative half cycles of input voltage from the secondary 20 through the potentiometer 78, the emitter and collector electrodes 35 and 36, diode 76, the secondary 21, and saturable reactor windings 24 and 23. This circuit of FIGURE 3 shows that the load 71 and control circuit 72 may essentially be reversed from their respective positions as shown in FIGURE 1 whenever a low voltage load is to be very accurately controlled in voltage. The circuit of FIGURE 3 operates essentially the same as that of FIGURE 1; namely, positive half cycles of current are passed by rectifier 73 to the direct current load 74 and during the negative half cycles of the alternating current input voltage, a desired amount of reset current is passed through the transistor load circuit 82. The amount of this reset current is controlled by the relative potential on the emitter 35 and base 37. This may be varied in any suitable manner such as by the potentiometer tap 83 which supplies the voltage in opposition to the reference voltage 80. In this circuit of FIGURE 3, the reset current flows through the entire saturable reactor windings and the load current flows through only the saturable reactor winding 23, yet this winding is controlled in impedance by the impedance of the entire saturable reactor 22.

Figure 4:
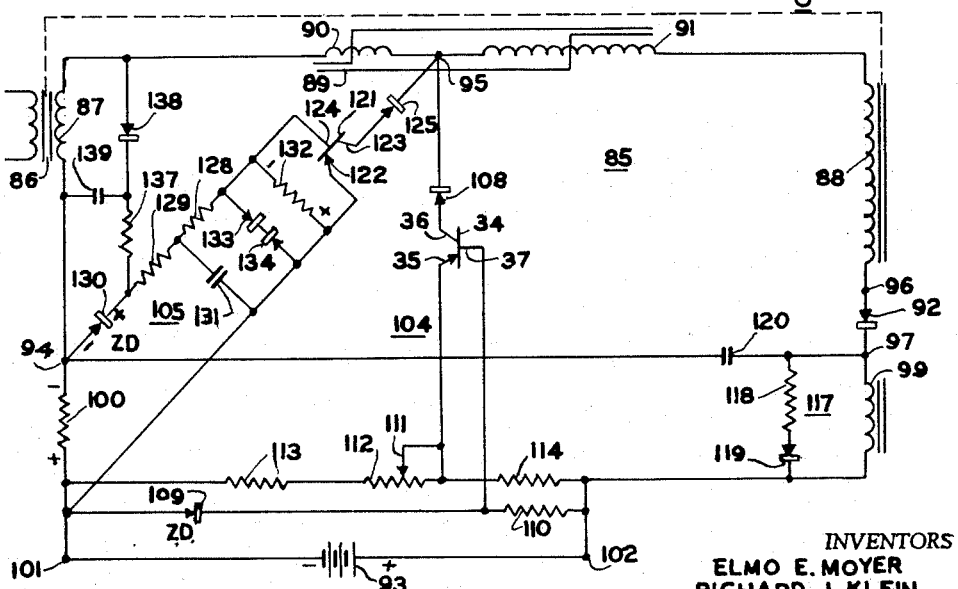
FIGURE 4 is a schematic diagram of another modification of the invention.

FIGURE 4 shows a combined voltage and current regulating circuit 85 which includes generally a transformer 86 having first and second secondaries 87 and 88, a saturable reactor 89 having first and second windings 90 and 91, a main rectifier 92 and a direct current load 93. The secondary 87 and saturable reactor winding 90 are connected in series between first and second terminals 94 and 95 and the second secondary 88 and second saturable reactor winding 91 are connected in series between the second terminal 95 and a third terminal 96. The load circuit may again be considered to include the main rectifier 92 and in this instance also includes a choke 99 and a current signal resistor 100. A fourth terminal 97 is connected between rectifier 92 and choke 99. Terminals 101 and 102 are provided on each side of the direct current load 93 and are the terminals to which the external load on the battery 93 would be connected. A first transistor load circuit 104 may be considered as a voltage regulating circuit and is similar in operation to the voltage regulating circuit or transistor load circuit 49 in FIGURE 1. A second transistor load circuit 105 may be considered as a current regulating circuit to regulate the current in the entire regulating circuit 85.

The voltage regulating circuit 104 includes generally the transistor 34 having the emitter, collector, and base electrodes 35, 36 and 37, respectively, a control diode 108 and a reference voltage standard in this case shown as a zener diode 109. The zener diode 109 is connected in series with a voltage dropping resistor 110 across the load 93 and a voltage feedback signal is obtained from a movable tap 111 of a potentiometer 112 having voltage derived from the load. In this case, the potentiometer 112 is shown connected across the load 93 by any suitable means such as a direct connection or voltage dropping resistors 113 and 114.

The choke 99 is a part of a filter circuit 117 including a damping resistor 118 and damping diode 119 connected in series and this series combination connected across the choke 99. A filter capacitor 120 is also connected essentially in parallel with the direct current load 93. This filter circuit 117 reduces the ripple voltage on the direct current load 93 and hence reduces the ripple voltage on the feedback potentiometer 112.

The current regulating circuit 105 utilizes the current signal resistor 100 as a source of voltage and includes and utilizes a second transistor 121 having emitter, collector, and base electrodes 122, 123, and 124, respectively. A current control diode 125 is connected in series with the emitter and collector electrodes 122 and 123 between the terminals 101 and 95. The base electrode 124 is connected to the terminal 94 through filter resistors 128 and 129 and a zener diode 130. A filter capacitor 131 is connected between the junction of resistors 128 and 129 and the terminal 101. A signal load resistor 132 is connected across the emitter and base electrodes 122 and 124. Opposed diode rectifiers 133 and 134 are connected in series across this signal load resistor. A resistor 137 and rectifier 138 are connected in series with the zener diode 130 across the secondary 87 in order to develop a direct current voltage as a reference voltage standard across this zener diode 130. A filter capacitor 139 is connected in series with the zener diode 130 and resistor 137 in order to maintain a keep-alive current for the zener diode during the half cycles of alternating current input voltage not passed by the rectifier 138.

Operation of FIGURE 4

Figure 5:
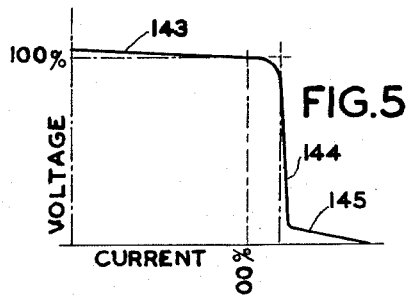
FIGURE 5 is a graph of voltage vs. current in the circuit of FIGURE 4.

The voltage regulating circuit 104 operates similar to the transistor load circuit 49 of FIGURE 1. Half cycles of load current are passed through the main rectifier 92 to the load 93 as determined by the additive voltages of secondaries 87 and 88 and by the impedance of the saturable reactor windings 90 and 91. Again the ratio of magnitude of voltage of secondaries 87 and 88 is substantially equal to the ratio of reactances of saturable reactor windings 90 and 91. The impedance of the saturable reactor 89 is controlled by the amount of reset current passed through the saturable reactor winding 90. The voltage regulating circuit 104 normally determines this reset current for all current flow below the rated current of the entire circuit 85. Throughout this current range of zero to 100% rated current, this voltage regulating circuit 104 controls the voltage as shown by the generally horizontal line portion 143 in the graph of voltage vs. current in FIGURE 5. If the voltage of the load 93 increases, the voltage in the zener diode remains substantially constant, yet the voltage at the potentiometer tap 111 becomes more positive and this places an increased positive potential on the emitter 35 relative to base 37. A greater amount of controlled current is therefore passed between these two electrodes and hence a greater reset current is passed from the emitter 35 to collector 36. This reset current flows during those half cycles wherein a negative potential is applied to the anode of the main rectifier 92 because during these negative half cycles, a positive potential is additively applied from secondary 87 and the left half of the feedback potentiometer 112 to the emitter 35. This reset current flows through the saturable reactor winding 90 in the direction opposite to that in which the load current flows during the positive half cycles. This increases the impedance of the saturable reactor 89 to thus decrease the load voltage and hence maintain it substantially constant throughout the full current range.

Should the load current exceed the designed value by a certain amount for example, 20%, the current regulating circuit 105 will come into effect. Normally the current regulating circuit 105 is inoperative since insufficient positive potential is applied to the emitter 122 relative to base 124. In this current regulating circuit 105, the voltages from the current signal resistor 100 and the zener diode 130 are in opposition with the current signal resistor 100 being that which applies a positive potential on the emitter 122. If the load current increases to 120% of rated current, for example, then the voltage on the current signal resistor 100 will increase sufficiently to cause a transistor control current to flow from the emitter 122 to the base 124 and return to the signal load resistor 132. This turns on the transistor 121 and hence transistor load current flows during the negative half cycles from secondary 87 through resistor 100, the emitter and collector electrodes 122 and 123, diode 125, and saturable reactor winding 90. This resets the saturable reactor 89 to offer a high impedance and hence for any attempted increase of current beyond this preset value, the current regulator circuit 105 will rapidly change toward a full conducting condition to limit the current as shown by the nearly vertical portion 144 on the graph of FIGURE 5. The voltage vs. current curve may have a flaring portion 145 as shown on FIGURE 5 depending upon the maximum value of voltage absorption of the saturable reactor 89.

A temperature compensating feature may be incorporated in the voltage regulating circuits of FIGURE 1 and FIGURE 4, in which case resistor 114 of FIGURE 4 may be one with a non-linear characteristic which decreases resistance as the temperature increases. Resistors of Carborundum or other suitable material are satisfactory and this resistor 114 may be placed in any suitable location even in a cell of the battery or in a dummy cell compartment of the battery 93. As the temperature decreases, it is desired to increase the terminal voltage of the battery 93 for a temperature compensation effect in many battery load circuits. As the temperature decreases, the voltage drop of resistor 114 will increase, thus decreasing the potential of the movable tap 111 relative to the potential on the base electrode 87 derived from the zener diode 109. This decreases the transistor control current and decreases the reset current to increase the load voltage. The current regulating circuit 105 also may have this temperature compensating feature by making resistor 128 non-linear in characteristic.

The current regulating circuit 105 also may have a transistor temperature compensating circuit as controlled by the opposing diode rectifiers 133 and 134 and paralleled resistor 132. These diode rectifiers may be made of essentially the same material as the transistor 121, for example, germanium. In such case, as the temperature increases to change the conducting characteristic of the transistor 121, the back current through the germanium diodes 133 and 134 will change in essentially the same amount in the same direction to lower the voltage across resistor 132 and thereby keep the reset current about the same. The circuit 85 may have this transistor temperature compensation on both the current regulating and voltage regulating functions by adding these opposing diodes between the emitter 35 and base 37 of transistor 34.

Figures 4A, 6, 7:
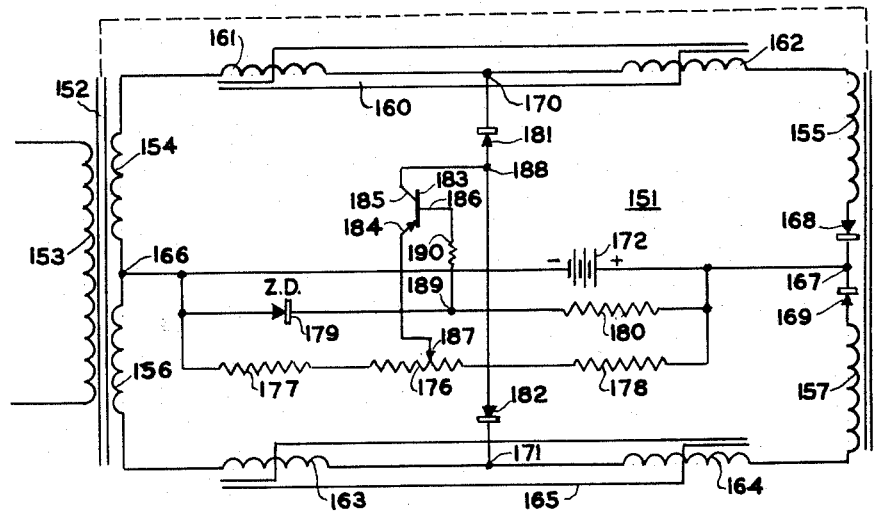
FIGURE 4A is a schematic diagram of a modification of FIGURE 4.
FIGURES 6 and 7 are schematic diagrams of still further modification of the invention.

FIGURE 4A is a modification of FIGURE 4, showing another means for obtaining a feedback voltage, again one which is dependent on load current. A transformer 86A has the first secondary 87 plus another secondary 146 of the same number of turns and hence having the same voltage. The zener diode 130 and capacitor 139 are connected to a new terminal 94A to which the lower end of secondary 146 is connected. Each of the secondaries 87 and 146 has inherent resistance, indicated by the dotted resistors 87R and 146R, respectively.

The current signal resistor 100 is eliminated and hence terminals 94 and 101 are connected together. The load current flows upwardly through resistor 87R making the lower end positive, and it is this inherent resistance across which a feedback voltage signal proportional to load current is developed. This feedback voltage is applied, through secondaries 87 and 146 in opposition to cancel their voltages, to the zener diode 130. The feedback signal and the voltage of the zener diode are thus again in opposition so that the difference voltage controls the transistor 121. The current regulating circuit 105A thus acts in the same way as the regulating circuit 105 of FIGURE 4. The elimination of the current signal resistor 100 has advantages in lowering the total resistance in the load circuit, to incur less losses and raise the efficiency. The secondary 87 inevitably has inherent resistance, and this is put to good use in developing the current feedback signal. The inherent resistance 146R has negligible affect on the circuit because the control current for the transistor 121 is very much smaller than the load current. Similarly extra windings may be added to the saturable reactors again in voltage opposing relationship to take advantage of the inherent resistance thereof in case a greater current feedback signal is desired.

FIGURE 6 is a voltage regulating circuit 151, in this case illustrated as a full wave diametric circuit. A transformer 152 has a primary 153 for energization from an alternating current source, and this transformer also has first through fourth secondaries 154, 155, 156 and 157, respectively. A saturable reactor 160 has first and second saturable reactor windings 161 and 162 on a common saturable core. Third and fourth saturable reactor windings 163 and 164 are provided on the common saturable core of another saturable reactor 165. A first output terminal 166 is connected at the junction of the first and third secondaries 154 and 156. A second output terminal 167 is connected between the first and second main rectifiers 168 and 169 which are connected in opposition. The four secondaries and the four saturable reactor windings, together with the rectifiers 168 and 169, are connected in a series loop to form the full wave diametric circuit supplying a direct current load to the output terminals 166 and 167. Control terminals 170 and 171 are connected at the junctions of the first and second saturable reactor windings and of the third and fourth saturable reactor windings, respectively. A direct current load represented by a storage battery 172, in this case having a counter-electromotive force, may be connected between the output terminals 166 and 167.

A voltage feedback potentiometer 176, together with resistors 177 and 178, are connected in series across the load 172. A zener diode 179 and a resistor 180 are also connected in series across the load 172 and hence the zener diode 179 acts as a reference voltage. First and second control diodes 181 and 182 are connected in opposition between the control terminals 170 and 171. A transistor 183 has an emitter, collector, and base electrodes 184, 185 and 186, respectively. The emitter electrode 184 is connected to a movable tap 187 on the potentiometer 176, and the collector electrode 185 is connected to a terminal 188 at the junction of the diodes 181 and 182. The base electrode 186 is connected through a resistor 190 to a terminal 189 at the junction of the zener diode 179 and resistor 180.

The ratio of the magnitude of voltage of the first and second secondaries 154 and 155 is generally equal to the ratio of the reactance of the first and second saturable reactor windings 161 and 162. The first and third secondaries 154 and 156 may be separate windings or may be merely a center-tapped winding; in any event the voltage of these two secondaries should be equal. The other half of the full wave diametric circuit should have the same reactance and voltage ratios as the first half; namely, the ratio of magnitude of voltage of the third and fourth secondaries 156 and 157 should be generally equal to the ratio of reactance of the third and fourth saturable reactor windings 163 and 164. In this series loop circuit including the four secondaries and the four saturable reactor windings, the voltages of the four secondaries are instantaneously additive. The voltage regulator circuit 151 operates generally similar to FIGURE 1 or the voltage regulator circuit 104 of FIGURE 4. As the voltage across the load 172 increases, the voltage at the movable tap 187 will become more positive relative to the terminal 189. This makes the emitter 184 more positive relative to the base 186 to increase the control current therebetween, and this increases the reset current from the emitter 184 to the collector 185. The rectifiers 168 and 169 are so poled that when the upper end of secondary 154 is positive, this places a positive voltage on anode of rectifier 168 to make it conduct. During this half cycle rectifier 169 does not conduct. However, since it is a full wave circuit, there will be a pulse of voltage positive at the movable tap 187 relative to the potential of the terminal 189; hence control current will pass through the transistor and consequently reset current is passed through the transistor 183. This reset current is caused by the positive voltage appearing at the upper end of secondary 156 plus the positive voltage across the resistor 177 and left half of potentiometer 176. These three additive voltage cause the reset current to flow through diode 182 and the saturable reactor winding 163. Conversely during the negative half cycles of the alternating current input when load current is flowing through the saturable reactor 165, the reset current flows through diode 181 and magnetic amplifier winding 161 as caused by the instantaneously additive voltages of secondary 154 and the voltage feedback at movable tap 187. It will thus be seen that each saturable reactor alternately conducts load current during its respective positive half wave cycles, and then during the respective negative half wave cycles that saturable reactor is being reset by reset current through one of the two windings on that particular saturable reactor. The amount of reset current of course determines the impedance and hence controls the voltage across the load. In the above described circuit as the load voltage increases, the reset current increases to increase the impedance of the saturable reactor and hence to decrease the load voltage.

FIGURE 7 shows a current regulating circuit 195 incorporating the same series loop circuit as in FIGURE 6 which provides a full wave diametric circuit for the load 172 across the output terminals 166 and 167. A current signal resistor 196 is connected in series with the load 172 as part of the load on circuit 195, and a terminal 197 is connected at the junction of the load 172 and resistor 196. The current regulating circuit 195 has components similar to the current regulating circuit 105 of FIGURE 4. Rectifiers 198 and 199 are connected in opposition across the serially connected secondaries 154 and 156 with the terminal 200 therebetween. A resistor 201 and a zener diode 202 are connected in series as a load for these full wave connected rectifiers 198 and 199. A filter capacitor 203 is connected in parallel with this load. A transistor 206 has emitter, collector and base electrodes 207, 208, 209, respectively, with the emitter 207 connected to the terminal 197. The collector 208 is connected to terminal 188 and the base 209 is connected through filter resistors 210 and 211 and through the zener diode 202 to the terminal 166. A filter capacitor 212 is connected between the terminal 197 and the junction of resistors 210 and 211. A signal load resistor 213 is connected across the emitter and base electrodes 207 and 209 and diode rectifiers 214 and 215 are connected in opposition across the signal load resistor 213.

The operation of FIGURE 7 is somewhat similar to that of the half wave circuit of the current regulating portion of FIGURE 4. The current signal resistor 196 develops a voltage thereacross, positive at the right end, which is dependent on a load condition; in this case load current. The rectifiers 198 and 199 are one means for developing a reference voltage standard; in this case the substantially constant voltage developed across the zener diode 202. The feedback voltage from the current signal resistor 196 is in opposition to the reference voltage from the zener diode 202 with respect to the emitter and base electrodes 207 and 209. As such, if the load current in load 172 becomes too great, the emitter 207 becomes more positive relative to the base 209 to increase the transistor control current and this will increase the transistor reset current from the emitter 207 to the collector 208. This reset current flows through the saturable reactor windings 161 and 163 to increase their impedance and thus decrease the load current. Again, similar to FIGURE 6, during the positive half cycles on the upper end of secondary 154, rectifier 168 will conduct load current and during at least a portion of this half wave cycle, reset current may flow from the transistor through the control diode 182 to reset the saturable reactor 165. Conversely during negative half cycles, when the main rectifier 169 is conducting, transistor reset current may flow through control diode 181 to reset the saturable reactor 160.

The voltage regulating circuit 151 of FIGURE 6 and the current regulating circuit 195 of FIGURE 7 may be used together, similar to such combination shown in FIGURE 4, for example.

In the various circuit arrangements, it will be noted that the secondaries of the transformers are voltage sources which supply the alternating voltage rectified by the rectifiers so that either half wave or full wave rectified current may be supplied to the load. The various circuits show two input terminals or at least some form of alternating voltage input means plus one or more rectifiers so that direct current may be supplied to two output terminals for a load. The half wave circuits of FIGURES 1, 4, and 4A show that less than the total voltage of the alternating current input is applied to the transistor by a tap on the secondary of the transformer or by two separate secondary windings. The saturable reactor is tapped at the same ratio of reactance, or as two separate windings of the same reactance ratio, so that only a portion of the voltage source and its corresponding winding of the saturable reactor is that series combination which applies a voltage to the transistor. This limits the peak voltage applied to the transistor to reasonable values. In the full wave diametric circuits of FIGURES 6 and 7, the voltage applied to the transistor is similarly limited in maximum value. This is because again only a portion of the total alternating current input voltage is applied to the transistor by means of secondaries 154 and 156 and actually the total of these two voltages is not applied to the transistor, rather only one at a time, because the base and emitter electrodes of the transistor are effectively connected to the mid-tap 166 through the reference voltage and feedback voltage sources. The circuit of FIGURE 3 is for use with low voltage loads and as such, the alternating voltage input may readily be made sufficiently small in magnitude to be below the peak voltage rating of the transistor in this circuit.

Although this invention has been described in its preferred form with a certain degree of particularly, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A rectifier circuit comprising, in combination, a rectifier device having an anode electrode, output means adapted to supply a direct current load, a saturable reactor having first and second windings, alternating voltage input means of a given value, a rectifier circuit connecting a voltage from said input means and at least one of said windings in circuit with said rectifier device and said output terminals to supply load current to said output terminals when the alternating voltage input is positive on said anode, a transistor, a transistor load circuit for said transistor connected to receive a voltage from said alternating voltage input means different from said given value and connected to control reset current through at least one of said saturable reactor windings, one of said load and reset currents passing through both said saturable reactor windings and the other passing through only one of said windings, and a transistor input circuit to control the conduction characteristics of said transistor.

2. A rectifier circuit comprising, in combination, a rectifier device, first and second output terminals adapted to supply a direct current load, a saturable reactor having first and second windings, alternating voltage input means of a given value, a rectifier circuit connecting said input means and both said windings in circuit with said rectifier device and said output terminals to supply load current to said output terminals when the alternating voltage input is positive on the anode of said rectifier device, means to supply a reset current to said saturable reactor which reset current flows in a direction opposite to load current through said first saturable reactor winding, said reset current means including a transistor, a transistor load circuit for said transistor connected to control reset current through only said first saturable reactor winding, a transistor input circuit to said transistor connected to receive an alternating voltage from said input means less than said given value, a reference voltage standard, means obtaining a feedback voltage derived in accordance with a condition of said load, and means for comparing said feedback voltage and said reference standard and connected in said transistor input circuit to control the conduction characteristics of said transistor.

3. An electrical regulating circuit comprising first and second alternating current input terminals, first and second output terminals adapted to be connected to a direct current load having counter-electromotive force, a rectifier device having an anode electrode, a saturable reactor having first and second windings, means for connecting both said saturable reactor windings and said rectifier device in series circuit between said input terminals and said output terminals so that a load current is passed through a load connected to said output terminals when a positive potential is applied to the anode of said rectifier, a transistor having an emitter, collector, and base electrodes, a reference voltage standard, a feedback voltage derived from said load, a transistor control circuit, means for connecting two of said transistor electrodes in series with said reference voltage standard and said feedback voltage in said transistor control circuit with the voltages of said feedback voltage and said reference voltage standard in opposition, a diode rectifier, a transistor load circuit including said diode rectifier and two of said transistor electrodes, and means connected in said transistor load circuit causing reset current flow in only said first saturable reactor winding corresponding to current in said transistor load circuit during a portion of the cycle of the alternating current input when the alternating current potential on said rectifier device anode is negative to thereby change the impedance of said saturable reactor in accordance with change in said feedback voltage.

4. A transistor controlled magnetic amplifier circuit comprising a first series combination of an alternating voltage source and a first saturable reactor winding and having first and second terminals, a second series combination of a second alternating voltage source and a second saturable reactor winding and having third and fourth terminals, means connecting in series said first and second series combinations at said second and third terminals, said first and second saturable reactor windings being on the same magnetic core, said first and second voltage sources being in phase, the ratio of magnitude of voltage of the first and second voltage sources being substantially equal to the ratio of reactance of said first and second saturable reactor windings, a load circuit including rectifier means and a direct current load having a counter-electromotive force connected in series, a control circuit including a transistor, means connecting said control circuit between said first terminal and one of said second and fourth terminals, means connecting said load circuit between said first terminal and the other of said second and fourth terminals to pass half wave pulses of current during first half cycles of the alternating voltage source, a reference standard, and reference voltage means comparing a voltage dependent on a load condition with said reference standard to control said transistor whereby said transistor passes reset current through at least a part of said saturable reactor windings during the opposite half cycles of the alternating voltage source.

5. A regulator circuit for a direct current load having a counter-electromotive force, comprising, in combination, a transformer having a primary adapted to be connected to an alternating current source, first and second secondary windings on said transformer, a first and second saturable reactor windings on one saturable reactor, a rectifier device, first and second control terminals, first and second output terminals for said load, means connecting said first secondary and said first saturable reactor winding in series between said first output and first control terminals, means connecting said second secondary and said second saturable reactor winding in series with said rectifier device between said first control and second output terminals, means connecting said second control terminal to said first output terminal, the ratio of magnitude of voltage of said first and second secondaries being substantially equal to the ratio of reactance of said first and second saturable reactor windings, a transistor having emitter, collector and base electrodes, a reference voltage standard, a feedback voltage derived from said load, conductor means connecting said emitter and base electrodes of said transistor in series with said reference voltage standard and said feedback voltage with said feedback voltage and said reference voltage standard being in opposition, a transistor load circuit including said emitter and collector electrodes, and means connected in said transistor load circuit causing reset current flow through said first and second control terminals and through said first saturable reactor winding corresponding to current in said transistor load circuit, whereby as the voltage of said direct current load changes in a given sense the potential of said emitter becomes more positive relative to said base electrode to pass more control current therebetween to consequently pass an increased transistor load current from said emitter to said collector electrode to thereby effect a change in the reset current through said first saturable reactor winding to change the impedance of said saturable reactor to thereby change the voltage of said direct current load in the opposite sense.

6. A full wave regulator circuit for a direct current load having a counter electromotive force, comprising, in combination, a transformer having a primary adapted to be connected to an alternating current source, first, second, third and fourth secondary windings on said transformer, first and second saturable reactor windings on one saturable reactor and third and fourth saturable reactor windings on another saturable reactor, first and second rectifier devices, first and second control terminals, first and second output terminals for said direct current load, means connecting said first secondary and said first saturable reactor winding in series between said first output and first control terminals, means connecting said second secondary and said second saturable reactor winding in series with said first rectifier device between said first control and second output terminals, means connecting said fourth secondary and said fourth saturable reactor winding in series with said second rectifier device between said second control and second output terminals with said rectifier devices being in opposition, means connecting said third secondary and said third saturable reactor winding in series between said first output and second control terminals, the ratio of magnitude of voltage of said first and second secondaries being substantially equal to the ratio of magnitude of voltage of said third and fourth secondaries and to the ratio of reactance of said first and second saturable reactor windings and to the ratio of reactance of said third and fourth saturable reactor windings, the magnitude of voltage of said first and third secondaries being substantially equal, the voltage drops of said saturable reactor windings being additive, a transistor having emitter, collector and base electrodes, a reference voltage standard, a feedback voltage derived from said load, conductor means connecting said emitter and base electrodes of said transistor in series with said reference voltage standard and said feedback voltage with said feedback voltage and said reference voltage standard being in opposition, a transistor load circuit including said emitter and collector electrodes, and means connected in said transistor load circuit causing reset current flow through said first and second control terminals and through said first and third saturable reactor windings corresponding to current in said transistor load circuit, whereby as the voltage of said direct current load changes in a given sense the potential of said emitter becomes more positive relative to said base electrode to pass more control current therebetween to consequently pass an increased transistor load current from said emitter to said collector electrode to thereby effect a change in the reset current through said first and third saturable reactor windings to change the impedance of said magnetic amplifier to thereby change the voltage of said direct current load in the opposite sense.

7. A full valve diametric circuit comprising in combination a transformer having a primary adapted to be connected to an alternating current source, first, second, third and fourth secondary windings on said transformer, first and second saturable reactor windings on a first saturable core, third and fourth saturable reactor windings on a second saturable core, a load circuit including a direct current load having a counter-electromotive force and first and second rectifier devices, means connecting in series circuit in the order named, said first secondary, said first and second saturable reactor windings, said second secondary, said first and second rectifier devices in opposed relationship, said fourth secondary, said fourth and third saturable reactor windings and said third secondary, said secondaries being connected in voltage additive relationship, the ratio of magnitude of voltage of said first and second secondaries being substantially equal to the ratio of magnitude of voltage of said third and fourth secondaries and to the ratio of reactance of said first and second saturable reactor windings and to the ratio of reactance of said third and fourth saturable reactor windings, the magnitude of voltage of said first and third secondaries being substantially equal, the voltage drops of said saturable reactor windings being additive, means connecting said direct current load between the junction of said rectifier devices and the junction of said first and third secondaries, a first control terminal connected at the junction of said first and second saturable reactor windings and a second control terminal connected at the junction of said third and fourth saturable reactor windings, a transistor having emitter, collector and base electrodes, a reference voltage standard, a feedback voltage derived from said load, conductor means connecting said emitter and base electrodes of said transistor in series with said reference voltage standard and said feedback voltage with said feedback voltage and said reference voltage standard in opposition, a diode rectifier, a transistor load circuit including said diode rectifier and said emitter and collector electrodes, and means connected in said transistor load circuit causing reset current flow in said first and third saturable reactor windings corresponding to current flow in said transistor load circuit, whereby as the voltage of said direct current load increases the potential of said emitter becomes more positive relative to said base electrode to pass more control current therebetween to consequently pass an increased transistor load current from said emitter to said collector electrode to thereby pass an increased reset current through said first and third saturable reactor windings to increase the impedance thereof to thereby decrease the voltage of said direct current load.

8. A voltage regulating transistor controlled magnetic amplifier control circuit for charging a battery, comprising, a power transformer having a primary and first and second windings of substantially equal voltage, means for connecting said primary to an alternating current source, a saturable reactor having first and second windings of substantially equal reactance, first and second power resistors of substantially equal value, first and second output terminals of said battery charger, a half wave rectifier device, means for connecting in series between said first and second output terminals said first secondary, said first saturable reactor winding, said first and second power resistors, said second saturable reactor winding, said second transformer secondary, and said half wave rectifier device, in the order named, said transformer secondaries being connected in voltage additive relationship, a reference resistor and a zener diode connected in series across said first and second output terminals, a feedback potentiometer connected across said output terminals and having a movable tap, a current limiting resistor, a current control diode, a PNP power transistor having emitter, collector, and base electrodes, means for connecting said current limiting resistor and said current control diode in series between said collector electrode and the junction of said first and second power resistors, said zener diode acting as a reference voltage source, means for connecting said emitter electrode to the junction of said reference resistor and said zener diode, means for connecting said base electrode to said movable potentiometer tap, the voltage between said movable tap and the common connection at said first output terminal between said reference resistor and said potentiometer being a feedback voltage, whereby as the voltage at said output terminals increases, the feedback voltage increases more rapidly than said reference voltage to increase the positive voltage on said emitter electrode relative to the base electrode to increase the control current out of the base electrode and hence to increase the reset current from the emitter to the collector electrode which reset current flows through said current control diode and through said first saturable reactor winding, said first secondary winding, and said reference resistor on the negative half cycles of alternating current which will not pass through said half wave rectifier device to reset the saturable reactor increasingly so that it offers increasing impedance to flow of current on the positive half cycles of alternating current which do flow through the half wave rectifier device to supply the rectified alternating current to said battery charger output terminals, and said power resistors limiting the current capable of being delivered at said output terminals upon short circuit.

9. A regulating circuit for a direct current load, comprising, a power transformer having a primary and first and second secondary windings, means for connecting said primary to an alternating current source, a saturable reactor having first and second windings of a reactance ratio substantially equal to the voltage ratio of said first and second secondaries, first and second output terminals, a half wave rectifier device, means for connecting said first secondary and said first saturable reactor winding in series between said first and second output terminals, first and second control terminals, means for connecting said second saturable reactor winding and said second transformer secondary in series between said second output and control terminals, said first control and output terminals being connected together, said secondaries being connected in voltage additive relationship, means connecting said rectifier device and said load in series between said output terminals, a reference voltage, a feedback voltage derived in accordance with a condition of said load, transistor means having emitter, collector, and base electrodes, transistor input means for connecting said feedback voltage and said reference voltage in opposition between said base and emitter electrodes, and a transistor load circuit including said emitter and collector electrodes and both said saturable reactor windings to pass reset current therethrough.

10. A transistor controlled magnetic amplifier circuit comprising a first series combination of an alternating voltage source and a first saturable reactor winding and having first and second terminals, a second series combination of a second alternating voltage source and a second saturable reactor winding and having third and fourth terminals, said first and second series combinations being connected together at said second and third terminals, said first and second saturable reactor windings being on the same magnetic core, said first and second voltage sources being in phase, the ratio of magnitude of voltage of the first and second voltage sources being squal to the ratio of reactance of said first and second saturable reactor windings, a load circuit including a rectifier and a direct current load having counter-electromotive force connected in series between said first and fourth terminals to pass half wave pulses of current during first half cycles of the alternating voltage source, a filter circuit in said load circuit, a control circuit including a transistor, means connecting said control circuit between said first and second terminals, a bleeder impedance connected across said direct current load, a reference voltage standard, and transistor input circuit means comparing a voltage obtained from said bleeder impedance with said reference voltage stadard to control said transistor whereby said transistor passes reset current from said first voltage source through said first saturable reactor winding during the opposite half cycles of the alternating voltage source.

11. A transistor controlled magnetic amplifier circuit comprising a first series combination of an alternating voltage source and a first saturable reactor winding and having first and second terminals, a second series combination of a second alternating voltage source and a second saturable reactor winding and having third and fourth terminals, said first and second series combinations being interconnected at said second and third terminals, said first and second saturable reactor windings being on the same magnetic core, said first and second voltage sources being in phase, the ratio of magnitude of voltage of the first and second voltage sources being equal to the ratio of reactance of said first and second saturable reactor windings, a load circuit including a rectifier and a direct current load having a counter-electromotive force connected in series between said first and fourth terminals to pass half wave pulses of current during first half wave cycles of the alternating voltage source, a filter circuit in said load circuit, a current signal resistor in said load circuit at said first terminal, a control circuit including a transistor, means connecting said control circuit between said first and second terminals, a reference voltage standard, and transistor input circuit means comparing a voltage obtained from said current signal resistor with said reference voltage standard to control said transistor whereby said transistor passes reset current from said first voltage source through said first saturable reactor winding during the opposite half cycles of the alternating voltage source.

12. A rectifier circuit for a direct current load, comprising, in combination, an alternating voltage input including a first inductive winding, rectifier means having an anode, direct current output means, means connecting said alternating voltage input in circuit with said rectifier means and said direct current output means to pass load current through said inductive winding and through said rectifier means to said output means during the period when said rectifier means anode is positive, a second inductive winding inductively coupled to and having substantially the same voltage as said first inductive winding, current signal means connecting said first and second inductive windings in voltage opposing relationship, and control means connected to said load and to said current signal means to control said load in accordance with the load curernt signal caused by the inherent resistance of said first inductive winding.

13. A transistor controlled magnetic amplifier circuit comprising a first series combination of an alternating voltage source and a first saturable reactor winding and having first and second terminals, a second series combination of a second alternating voltage source and a second saturable reactor winding and having third and fourth terminals, said first and second series combinations being interconnected at said second and third terminals, said first and second saturable reactor windings being on the same magnetic core, said first and second voltage sources being in phase, the ratio of magnitude of voltage of the first and second voltage sources being substantially equal to the ratio of reactance of said first and second saturable reactor windings, a load circuit including rectifier means and a direct current load having a counter-electromotive force connected in series between said first and fourth terminals, a filter circuit connected in said load circuit, a control circuit including a transistor means connecting said control circuit between said first and second terminals, a reference voltage, said first and second voltage sources being first and second secondaries on a transformer, a third secondary on said transformer having a common connection with said first secondary and having substantially equal voltage thereto, and transistor input circuit connecting said reference voltage in series with said first and third secondaries in voltage opposing relationship to utilize the voltage drop of the inherent resistance of said first secondary as a current feedback signal to control said transistor, whereby said transistor passes reset current through at least a part of said saturable reactor windings during half cycles of the alternating voltage source.

14. A voltage regulator full wave diametric circuit comprising, in combination, a transformer having a primary adapted to be connected to an alternating current source, first, second, third and fourth secondary windings on said transformer, a saturable reactor having a saturable core and first, second, third and fourth windings, a load circuit including a direct current load having a counter-electromotive force and first and second rectifier devices, means connecting in series circuit in the order named, said first secondary, said first and second saturable reactor windings, said second secondary, said first and second rectifier devices in opposed relationship, said fourth secondary, said fourth and third saturable reactor windings and said third secondary, said secondaries being connected in voltage additive relationship, the ratio of magnitude of voltage of said first and second secondaries being substantially equal to the ratio of magnitude of voltage of said third and fourth secondaries and to the ratio of reactance of said first and second saturable reactor windings and to the ratio of reactance of said third and fourth saturable reactor windings, the magnitude of voltage of said first and third secondaries being substantially equal, the voltage drops of said saturable reactor windings being additive, means connecting said direct current load between the junction of said rectifier devices and the juncture of said first and third secondaries, a bleeder resistance connected in parallel with said direct current load, a voltage divider having a movable tap as part of said bleeder resistance, a zener diode and a voltage dropping resistor connected in series and connected in parallel with said direct current load, a control circuit including a transistor having emitter, collector and base electrodes, conductor means connecting said emitter electrode to said movable tap, means connecting said base electrode to the junction of said zener diode and said voltage dropping resistor, first and second diode rectifiers connected in series opposition and connected between the junction of said first and second saturable reactor windings and the junction of said third and fourth saturable reactor windings, and means connecting said collector electrode to the junction of said first and second diode rectifiers, whereby as the voltage of said direct current load increases the voltage across said bleeder resistance and said voltage dropping resistor increases to make the potential of said emitter electrode more positive relative to said base electrode to increase the control current therebetween and to increase the reset current from said first and third secondaries through part of said bleeder resistance and through said emitter and collector electrodes and said first and third saturable reactor windings to increase the impedance of the entire saturable reactor to decrease the voltage across said direct current load.

15. A current regulator full wave diametric circuit comprising, in combination, a transformer having a primary adapted to be connected to an alternating current source, first, second, third and fourth secondary windings on said transformer, a saturable reactor having a saturable core and first, second, third and fourth windings, a load circuit including a direct current load having a counter-electromotive force and first and second rectifier devices, means connecting in series circuit in the order named, said first secondary, said first and second saturable reactor windings, said second secondary, said first and second rectifier devices in opposed relationship, said fourth secondary, said fourth and third saturable reactor windings and said third secondary, said secondaries being connected in voltage additive relationship, means connecting said direct current load between the junction of said rectifier devices and the juncture of said first and third secondaries, a current signal resistor connected in series with said direct current load, rectifier means connected to said transformer, a zener diode and a voltage dropping resistor connected in series as a load for said rectifier means, a control circuit including a transistor having emitter, collector and base electrodes, conductor means connecting said emitter to the junction of said current signal resistor and said direct current load, means connecting said base electrode to the junction of said zener diode and said voltage dropping resistor with said zener diode acting as reference voltage standard, first and second diode rectifiers connected in series opposition and connected between the junction of said first and second saturable reactor windings and the junction of said third and fourth saturable reactor windings, and means connecting said collector electrode to the junction of said first and second diode rectifiers, whereby as the current through said direct current load increases, the voltage across said current signal resistor increases to make the potential of said emitter electrode more positive relative to said base electrode to increase the control current therebetween and to increase the reset current from said first and third secondaries through said current signal resistor and through said emitter and collector electrodes and said first and third saturable reactor windings to increase the impedance of the entire saturable reactor to decrease the current to said direct current load.

References Cited in the file of this patent

UNITED STATES PATENTS

| | | |
|---|---|---|
| 2,843,818 | Mintz et al. | July 15, 1958 |
| 2,857,563 | Syrbe | Oct. 21, 1958 |
| 2,903,639 | Meszaros | Sept. 8, 1959 |
| 2,955,247 | Moyer et al. | Oct. 4, 1960 |